(12) United States Patent
Zhang et al.

(10) Patent No.: US 8,300,189 B2
(45) Date of Patent: Oct. 30, 2012

(54) LIQUID CRYSTAL DEVICE AND METHODS THEREOF

(75) Inventors: Ke Zhang, Stow, OH (US); Philip J. Bos, Hudson, OH (US); Robert J. Twieg, Kent, OH (US); Na Liu, Bloomfield, CT (US)

(73) Assignee: Kent State University, Kent, OH (US)

( * ) Notice: Subject to any disclaimer, the term of this patent is extended or adjusted under 35 U.S.C. 154(b) by 733 days.

(21) Appl. No.: 12/459,153

(22) Filed: Jun. 26, 2009

(65) Prior Publication Data

US 2010/0014037 A1   Jan. 21, 2010

Related U.S. Application Data

(60) Provisional application No. 61/078,358, filed on Jun. 27, 2008.

(51) Int. Cl.
*G02F 1/1337* (2006.01)
*G02F 1/1333* (2006.01)

(52) U.S. Cl. ........ 349/129; 349/199; 428/1.2; 428/1.25; 428/1.26

(58) Field of Classification Search .................. 428/1.2, 428/1.25, 1.26; 349/129, 199
See application file for complete search history.

(56) References Cited

U.S. PATENT DOCUMENTS

| | | | |
|---|---|---|---|
| 5,186,985 A | | 2/1993 | Estes et al. |
| 6,067,139 A | * | 5/2000 | Bohm et al. .................. 349/123 |
| 6,128,058 A | * | 10/2000 | Walton ........................... 349/129 |
| 2008/0143933 A1 | * | 6/2008 | Sha et al. ...................... 349/106 |

OTHER PUBLICATIONS

Jones T.K. Wan, Ophelia K. C. Tsui, Hoi-Sing Kwok and Ping Sheng, "Liquid crystal pretilt control by inhomogeneous surfaces," *Physical Review E 72*, pp. 021711-1-021711-4, 2005, The American Physical Society.

Jong Bok Kim, Kyung Chan Kim, Han Jin Ahn, Byoung Har Hwang, Dong Choon Hyun and Hong Koo Baik, "Variable liquid crystal pretilt angles on various compositions of alignment layers," *Applied Physics Letters 90*, pp. 043515-1-043515-3, 2007, American Institute of Physics.

E-Dubois-Violette and P. G. De Gennes, "Effects of Long Range van der Waals Forces on the Anchoring of a Nematic Fluid at an Interface," *Journal of Colloid and Interface Science*, vol. 57, No. 3, Dec. 1976, pp. 403-410, Academic Press, Inc.

E-Dubois-Violette and P. G. De Gennes, "Local Frederiks Transitions Near a Solid/Nematic Interface, *Le Journal de Physique-Lettres*," 36, Oct. 1975, pp. L-255-L-258, France.

(Continued)

*Primary Examiner* — Shean C Wu
(74) *Attorney, Agent, or Firm* — Fay Sharpe LLP

(57) ABSTRACT

Provided is a liquid crystal (LC) device and method thereof. The device comprises (i) a body of liquid crystal, (ii) a first layer comprising a first material, and (iii) a second layer comprising a second material; wherein the first layer is located between the body of liquid crystal and the second layer; the first layer alone aligns the liquid crystal in a first orientation; the second layer alone aligns the liquid crystal in a second orientation; and the first orientation is different from the second orientation. With optimized first layer thickness, the invention can be used in sensor applications to improve detection sensitivity, and in LCD applications with enhanced control over LC pretilt transition.

25 Claims, 10 Drawing Sheets

OTHER PUBLICATIONS

T. J. Scheffer and J. Nehring, "Accurate determination of liquid-crystal tilt bias angles," *Journal of Applied Physics*, vol. 48, No. 5, May 1977, pp. 1783-1792, American Institute of Physics.

L. M. Blinov and A. A. Sonin, "The Interaction of Nematic Liquid Crystals with Anisotropic Substrates," *Mol. Cryst. Liq. Cryst. Sci.*, 1990, 179, pp. 13-25.

A. A. Sonin, "*The Surface Physics of Liquid Crystals*," pp. 26-29; 48-49, Gordon and Breach Publishers, 1995.

Linda T. Creagh and Allan R. Kmetz, "Mechanism of Surface Alignment in Nematic Liquid Crystals," *Molecular Crystals and Liquid Crystals*, 1973, vol. 24, pp. 59-68, Gordon and Breach Science Publishers, Great Britain.

* cited by examiner

LIQUID CRYSTAL DEVICE AND METHODS THEREOF

BACKGROUND OF THE INVENTION

This application claims priority based on the U.S. Provisional Application 61/076,358 filed on Jun. 27, 2008, which is incorporated herein by reference in its entirety.

The present invention is related to a liquid crystal (LC) device and methods thereof. It finds particular application in conjunction with liquid crystal display (LCD), STN and SmC* devices; and sensors for electric field, magnetic field, thermal field, chemical species, biochemical species, biological species, or any combination thereof, and will be described with particular reference thereto. However, it is to be appreciated that the present invention is also amenable to other like applications.

Benchtop spectroscopic methods such as mass spectroscopy, gas chromatography, and infrared spectroscopy can give precise and quantitative detection. However, these methods use bulky instruments which are not portable, and it is complex to provide real-time detection. A liquid crystal sensor is another option for chemical detection, which is usually based on simple mechanisms, compact design, inexpensive materials, and label free detection.

As advantages of LC based optical sensors, birefringent properties and extreme sensitivity to surface interactions place LC in a unique position in the sensor application. Due to its features such as the elastic long range interaction between LC molecules, high birefringence, low viscosity, and thin film technology, a LC based optical sensor exhibits specific advantages such as amplified signal, label free detection, fast response, portability, and low cost.

The fluidic nature of a liquid crystal promotes fast and highly sensitive response to external stimuli such as electric/magnetic/thermal field, chemical, and biological species. The highly anisotropic molecular structures and ordered molecular arrangements of a liquid crystal can generate extraordinary optical, electric, and magnetic effects. The combination of these characteristics makes LCs an ideal material for sensor applications. Today's ubiquitous LCDs are essentially LC based electric field sensors, where a LC molecule's orientation is rotated by an electric field triggering a macroscopically visible signal. As an electric field switches the LC away from the state defined by the alignment film, a change in optical response is produced. This interaction between the electric field and the liquid crystal is the general principle for the operation of most LC display devices. Many chemical/bio species can induce similar responses in LCs either by themselves or, more commonly, paired with specially tailored substrates and thin films. The prior art technique has many attractive advantages, such as simple and compact design, portable and even wearable devices, and label free detection; and thanks to mature LCD technology, the device can be very cheap and easy to manufacture.

As LCs become increasingly important for display, telecom, and biological applications, more complete control of alignment characteristics of the liquid crystal director would be advantageous. Many research groups have investigated homogeneous alignment layers, such as common polyimides, but it has proved difficult to control certain characteristics of the director alignment. For example, control of an anchoring transition for bistable devices and sensors, or control of the pretilt over the entire angular range from 0 to 90 degrees, are both difficult to achieve. The pretilt angle is an important parameter for characterization of an alignment film, which is the angle between the LC director and the film plane.

Another method for pretilt control involves the use of a heterogeneous alignment film, wherein the alignment of LC molecules results from the averaged interaction of regions that provide a different alignment preference. An example is a multilayer film proposed by de Gennes, Dubois-Violette (Sonin, A. A. *The surface physics of liquid crystals*. Gordon and Breach Publishers, 1995) and Hinov (Blinov, L. M. and Sonin, A. A. The interaction of nematic liquid crystals with anisotropic substrates. *Mol. Cryst. Liq. Cryst. Sci.*, 1990. 179: p. 13-25) who predicted a "local Frederiks transition" of LC alignment on a crystalline surface covered with a thin amorphous film. The crystalline substrates considered imposed planar alignment of LCs via long range van de Waals (VDW) forces, while a short-range interaction between the LC and the top amorphous film favored homeotropic alignment. Later, Blinov and Sonin observed the anchoring transition of MBBA on a Langmuir-Blodgett film coated mica surface (See Wan, J. T. K.; Tsui, O. K. C.; Kwok, H.-S., and Sheng, P. Liquid crystal pretilt control by inhomogeneous surfaces. *Phys. Rev. E*, 2005. 72(2): p. 021711/1-021711/4; and Yeung, F. S.; Ho, J. Y.; Li, Y. W.; Xie, F. C.; Tsui, O. K.; Sheng, P., and Kwok, H. S. Variable liquid crystal pretilt angles by nanostructured surfaces. *Appl. Phys. Lett.*, 2006. 88(5): p. 051910/1-051910/3). They found an abrupt planar to homeotropic anchoring transition as the LB film thickness increases, which can be denoted this as a Type I pretilt transition.

In contrast to the continuous layers, a spatially heterogeneous single layer alignment film has recently been investigated for example by Kwok (Estes, W. E.; Higley, D. P.; Auman, B. C., and Feiring, A. E., Liquid crystal displays of high tilt bias angles. U.S. Pat. No. 5,186,985, Feb. 19, 1993; and Creagh, L. T. and Kmetz, A. R. Mechanism of Surface Alignment in Nematic Liquid Crystals. *Mol. Cryst. Liq. Cryst. Sci.*, 1973. 24(1&2): p. 59-68) for 0 to 90° degree pretilt control. Kwok mixed commercial vertical and planar aligning polyimides (PIs) and obtained thin films with a spatially uniform microphase separation. On the vertical/planar PI enriched domains the LC molecules align vertically/planarly. The LC director acquires an averaged pretilt in the bulk. The pretilt value is determined by the area ratio and the anchoring energy difference between the two PIs. This pretilt transition as the area ratio is changed is much more gradual than the abrupt Type I pretilt transition, and is denoted as Type II pretilt transition.

Moreover, the sensitivity of the LC sensor strongly relies on the surface condition on the substrate and the interaction between the LC and the surface features. When this interaction between LC and unsensed surface (i.e. surface before being exposed to target species) is very strong, it would be difficult or require a high level of target molecules to trigger the orientation change. Therefore, in order to increase the sensitivity, it is crucial to tune the interaction between a LC and unsensed surface just above the threshold requirement for the orientation change.

Advantageously, the present invention provides a liquid crystal (LC) device and methods of using and making the same. The device, when used in sensor applications, exhibits improved sensitivity; and when used in LCD applications, exhibits enhanced control over pretilt transition, among other merits.

BRIEF DESCRIPTION OF THE INVENTION

One aspect of the invention provides a liquid crystal device comprising:
(i) a body of liquid crystal,
(ii) a first layer comprising a first material, and
(iii) a second layer comprising a second material;

wherein the first layer is located between the body of liquid crystal and the second layer;

the first layer alone aligns the liquid crystal in a first orientation;

the second layer alone aligns the liquid crystal in a second orientation; and the first orientation is different from the second orientation.

Another aspect of the invention provides a method of improving the sensitivity of a liquid crystal device's response to external stimuli including using the afore-mentioned liquid crystal device.

Still another aspect of the invention provides a method of making a liquid crystal device, including:

(i) providing a body of liquid crystal, (ii) providing a first layer comprising a first material, (iii) providing a second layer comprising a second material, and (iv) depositing the first layer at least partially on the second layer;

wherein the first layer is located between the body of liquid crystal and the second layer; the first layer alone aligns the liquid crystal in a first orientation; the second layer alone aligns the liquid crystal in a second orientation; and the first orientation is different from the second orientation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
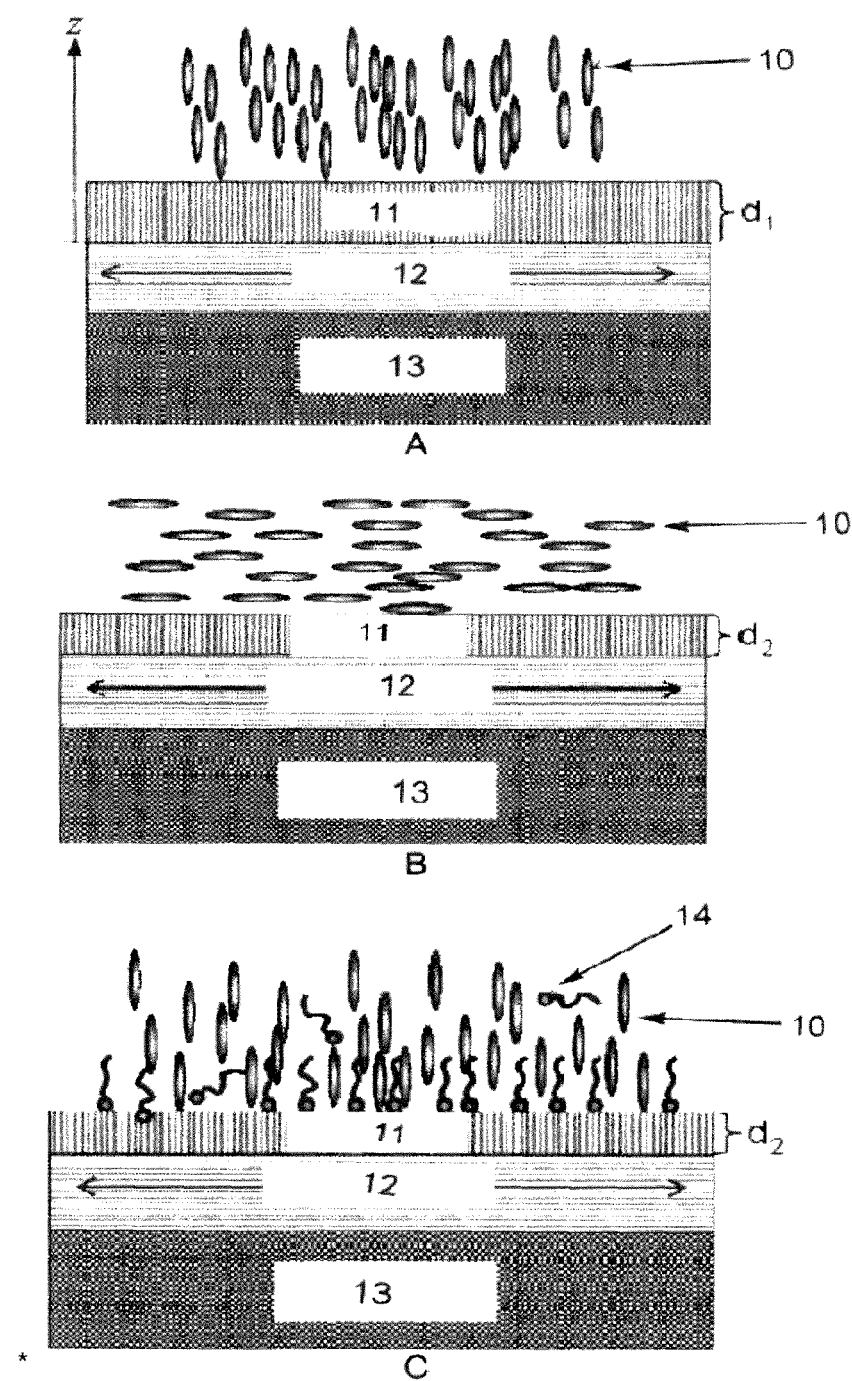
FIG. 1 schematically demonstrates the liquid crystal orientation on Double Layer Alignment Film (DLAF) in an embodiment according to the present invention.

In various embodiments of the invention, the first layer (sometimes referred to as a/the top layer in this description) may be continuous or discontinuous. The second layer (sometimes referred to as a/the bottom layer in this description) may be continuous or discontinuous too, but it is preferably continuous. Both the first layer and the second layer may take the form of, for example, an alignment film. Embodiments of the invention can thus be viewed as utilizing a Double Layer Alignment Film (DLAF) to obtain greater control of the alignment characteristics, including but not limited to, pretilt behavior of the liquid crystal director.

The first orientation and the second orientation can be any orientations, as long as they are different from one another. For example, when the first layer is discontinuous, it alone aligns the liquid crystal in homeotropic/planar orientation; and the second layer alone aligns the liquid crystal in planar/homeotropic orientation. In exemplary embodiments, when the first layer is continuous, it alone preferably aligns the liquid crystal in homeotropic orientation; and the second layer alone preferably aligns the liquid crystal in planar orientation.

The DLAF method of the invention can be used to realize both Type I and Type II transitions. In exemplary embodiments, a substrate may be first coated with e.g. a regular mainchain polymer to form the second or bottom layer that provides strong alignment, such as planar alignment. Next, a fluorinated polymer material may be chosen as the top layer to create Type I or Type II pretilt control, respectively. These corresponding two types of alignment layers may be abbreviated as DLAF-1 and DLAF-2, in which DLAF-1 alignment films have a continuous first/top layer of a polymer such as a fluorinated polymer, and DLAF-2 alignment films have a discontinuous first/top layer of a polymer such as a fluorinated polymer.

The second layer or the bottom layer can be made from any suitable material that induces desirable LC alignment. In some embodiments, the bottom layer was made from Pyralin 2555 (2555, or PI 2555), which is a copolymer of benzophenone tetracarboxylic dianhydride (BTDA) and a mixture of the two diamines, 4,4'-oxydianiline (ODA) and m-phenylenediamine (MPD).

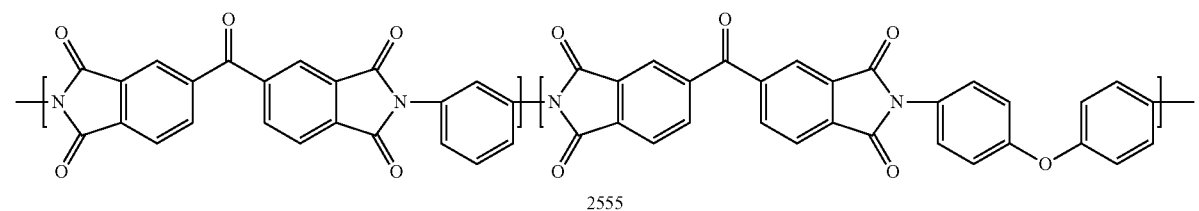

2555

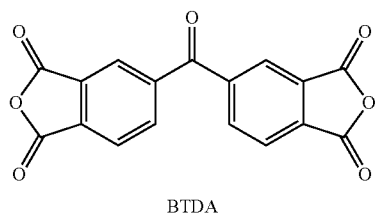

BTDA

-continued

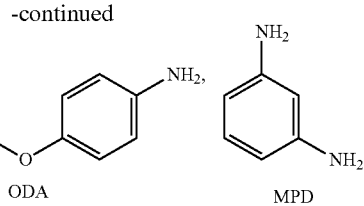

ODA          MPD

Rubbed 2555 thin films provide strong planar alignment for LCs. To change the pretilt angle (i.e. the long axis of LC to the rubbing direction of alignment film such as 2555), another layer can be introduced on the top of 2555, which favors homeotropic alignment of LCs.

In exemplary embodiments, the first material comprises a fluorinated polymer such as a fluorinated polyimide.

In specific embodiments, the first material comprises a fluorinated polyimide (FPI) represented by the following formula:

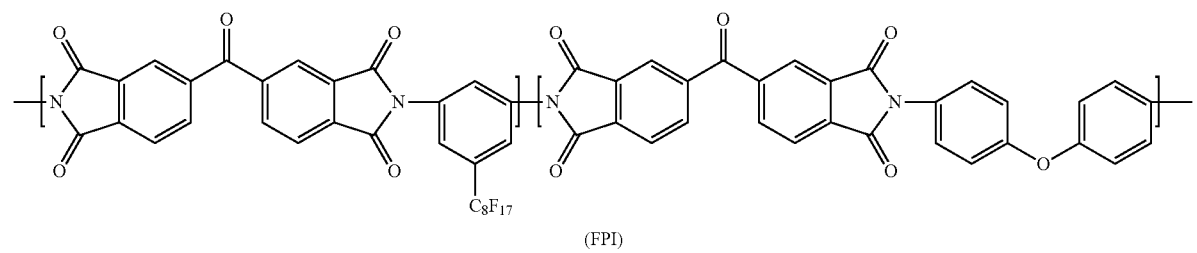

(FPI)

In a specific example, the DLAF consists of a first layer such as a thin fluorinated polymer layer on the top of a second layer such as rubbed non-fluorinated, non-branched polyimide layer, (e.g. PI 2555). Two types of fluorinated polymer with different chemical structures and wetting behavior on PI2555 were chosen, to provide either continuous or discontinuous top layers. The continuous top layer DLAF (DLAF-1) shows an abrupt pretilt transition from planar to homeotropic as the top layer thickness increases. The discontinuous top layer DLAF (DLAF-2) exhibits a gradual transition where the pretilt correlates with the coverage of the fluorinated top layer. These two types of transitions fit with de Gennes' local Frederiks transition and Kwok's inhomogeneous alignment theories, respectively. The abrupt pretilt transition may be promising for e.g. chemical/bio sensor applications, while the gradual transition is suitable for pretilt control in LCD devices; and STN and SmC* devices.

The invention provides a liquid crystal device having the ability to control the final alignment of LC on the double layer film by adjusting the first or top layer thickness. In some exemplary embodiments, the first layer is continuous with a thickness in the range of from about $0.50 \times d_{abr}$ to about $1.00 \times d_{abr}$, preferably from about $0.75 \times d_{abr}$ to about $1.00 \times d_{abr}$, and more preferably from about $0.90 \times d_{abr}$ to about $1.00 \times d_{abr}$, wherein $d_{abr}$ is the thickness of the first layer which triggers an abrupt transition of the liquid crystal alignment from the second orientation to the first orientation.

In other exemplary embodiments, the first layer is discontinuous, and a direct interface is formed between a part of the liquid crystal body surface and a part of the second layer surface. The orientation of the liquid crystal typically exhibits a gradual transition between the first orientation and the second orientation depending upon the area ratio between the liquid crystal/first layer interface and the liquid crystal/second layer interface.

Without intention to be bound by any particular theory, it is believed that the heavily fluorinated side chains on the FPI may be expected to preferentially reside on the surface owing to their low polarizabilty, and serve as a source of low surface tension, which favors homeotropic alignment of the LC molecules. The backbone structure for this polyimide is similar to that found in PI 2555 so as to promote wetting and the formation of the uniform double layer structures, which are required for Type I pretilt control.

In other specific embodiments, the fluorinated polymer comprises a copolymer of 4,5-difluoro-2,2-bis(trifluoromethyl)-1,3-dioxole and tetrafluoroethlyene (AF601). Without intention to be bound by any particular theory, it is believed that, judging from their chemical structures, AF601 is anticipated to dewet on the PI 2555, and lead to a heterogeneous surface for Type II pretilt transition.

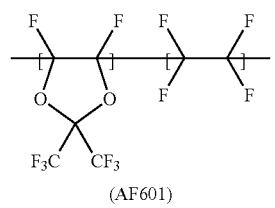

(AF601)

In specific embodiments, the first material comprises the mixture of two components at any ratio, for example, a copolymer of 4,5-difluoro-2,2-bis(trifluoromethyl)-1,3-dioxole and tetrafluoroethlyene (AF601) and a polymer represented by the following formula (FPI):

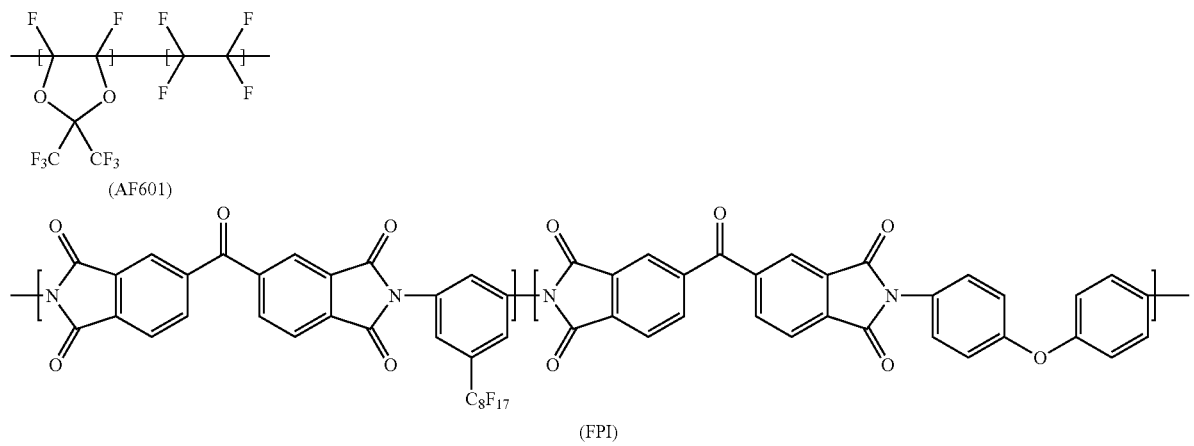

(AF601)

(FPI)

In exemplary embodiments, the second material comprises a non-fluorinated polymer.

In exemplary embodiments, the non-fluorinated polymer comprises a straight-chain or non-branched polyimide.

In exemplary embodiments, the straight-chain polyimide comprises a copolymer made from benzophenone tetracarboxylic dianhydride (BTDA) and a mixture of the two diamines, 4,4'-oxydianiline (ODA) and m-phenylenediamine (MPD).

In exemplary embodiments, the liquid crystal device with a continuous first layer can be widely used in sensor applications such as sensors for electric field, magnetic field, thermal field, chemical species, biochemical species, biological species, or any combination thereof.

In exemplary embodiments, the liquid crystal device with a discontinuous first layer can be widely used in displaying applications such as a LCD; and in STN and SmC* devices.

The present invention also provides a method of improving the sensitivity of a liquid crystal device's response to an external stimulus including:

using a liquid crystal device comprising:
(i) a body of liquid crystal,
(ii) a first layer comprising a first material, and
(iii) a second layer comprising a second material;
wherein the first layer is located between the body of liquid crystal and the second layer;
the first layer alone aligns the liquid crystal in a first orientation;
the second layer alone aligns the liquid crystal in a second orientation; and
the first orientation is different from the second orientation.

In exemplary embodiments, the external stimulus is selected from electric field, magnetic field, thermal field, chemical species, biochemical species, biological species, and any combination thereof.

In exemplary embodiments, the external stimulus comprises a surfactant compound such as lecithin, which was selected as a target molecule to demonstrate the capability to tune the sensitivity.

It should be understand that the present invention may be used with other agents, such as immobilized receptors. For example, a specific receptor may be introduced on the layer and used as a selective receptor/ligand bonding (e.g. biotin/avidin) to increase the selectivity of a device such as a LC sensor.

Without any intention to be bound by any particular theory, it is believed that the mechanism of the invention may be illustrated by FIG. 1. FIG. 1 schematically demonstrates the liquid crystal 10 orientation on DLAF. When top layer 11 is thick (thickness $d_1$ in A), long range Van de Waals forces from the bottom layer 12 on substrate 13 were shielded by the top layer 11. Short range interactions become the primary force and align the LC 10 homeotropically. When the top layer 11 is thin (thickness $d_2$ in B), long range Van de Waals forces can overcome the short range interactions from the top layer 11, and align LC 10 homogeneously. Lecithin 14 or other chemicals, when mixed with the LC 10 in low concentrations, can enhance the short range interactions and trigger an anchoring transition (C).

Based on the foregoing, it is seen that the specially designed double layer alignment film allows for tuning of the LC orientation by varying the top layer thickness. Without an intention to be bound by any particular theory, it is believed that, first the rubbed bottom layer affects LC alignment through long range Van der Waals forces. Then the top coating influences the first molecular layer of LC molecules. The orientation of LC molecules in the bulk is caused by the balance between the long range Van de Waals forces reaching from the bottom layer as well as the elastic force due to the surface anchoring of the first molecular layer in contact with the alignment film. According to de Gennes local Frederiks transition theory (E. Dubois-Violette and P. G. d. Gennes; Local Frederiks transitions near a solid/nematic interface. *J. Phys. Lett.* (*France*), 1975. 36(10): p. 255-258; and E. Dubois-Violette and P. G. D. Gennes; Effects of long range van der Waals forces on the anchoring of a nematic fluid at an interface *J. Colloid Interface Sci.*, 1976. 57(3): p. 403-410), the energy of the interface (unit, J/m) can be written as:

$$F = -\frac{1}{2}A\sin^2\theta_0 + \int_d^\infty \left[\frac{1}{2}U(z)\sin^2\theta + \frac{1}{2}K\left(\frac{d\theta}{dz}\right)^2\right]dz$$

Where, DeGennes was considering the case where the top (first) layer promotes planar alignment, and the second layer promotes homeotropic alignment. Theta is zero for homeotropic alignment. In the formula, A describes the short range anchoring and $\theta_0=\theta(d)$ is the orientation angle at the interface; $U(z)$ is the Van der Waals torque and $U(z)\sim z^{-3}$ when the alignment is uniaxial ($U(z)\sim z^{-5}$, if substrate is isotropic); K is an average elastic constant for a LC. Either planar or perpendicular anchoring was considered. It is assumed that there is no deformation ($\theta_0=\theta$) of the liquid crystal director orientation to eliminate the elastic energy. This assumption provides a basis that the inventors have built upon since the short range interaction only works on the first layer of the liquid crystal. Therefore, the formula is simplified to:

$$F = -\frac{1}{2}A\sin^2\theta + \frac{1}{2}\sin^2\theta \int_d^\infty U(z)dz$$

Figure 2:
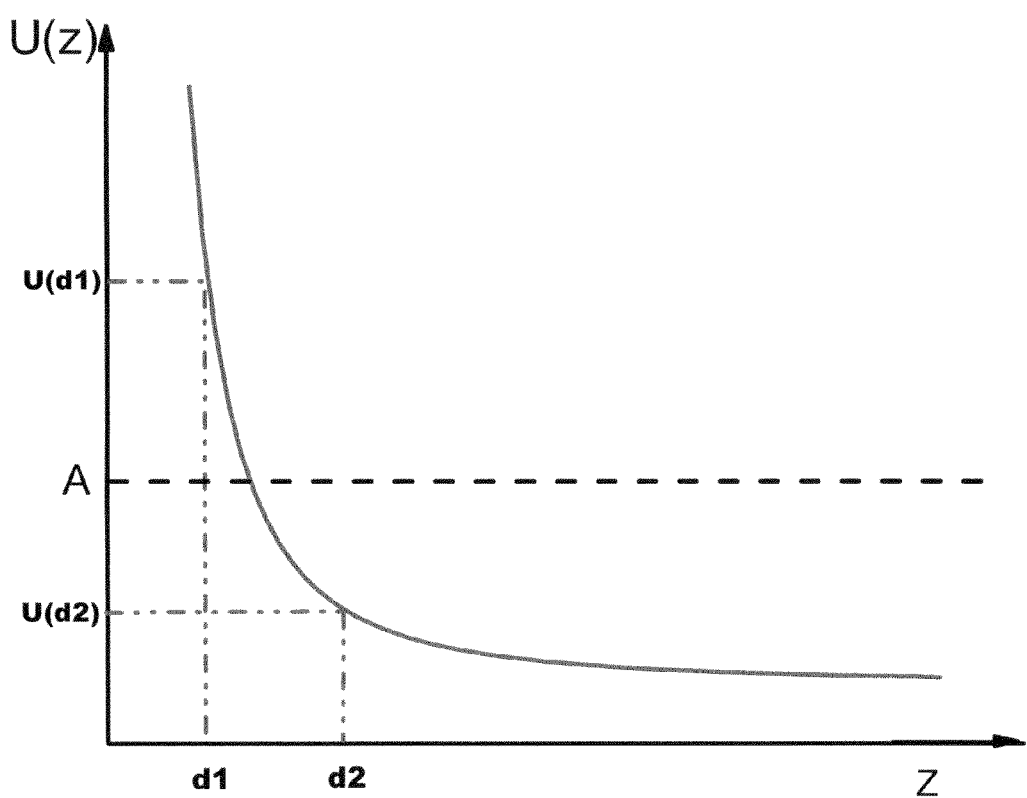
FIG. 2 shows the relationship between Van der Waals torque to the separation distance, z, between LC molecules to the second or bottom layer in a DLAF.

As can be seen, the first term decreases the energy of the system if theta increases, and the alignment becomes more nearly planar, while the second term increases the energy of the system. Therefore the first term tends to drive the liquid crystal orientation to a planar state, while the second term tends to drive the liquid crystal orientation to a homeotropic state. As the second term is dependent on the top layer thickness, d, the value maybe adjusted by changing d, as illustrated in FIG. 2. When $A \approx \int_d^\infty U(z)dz$, an anchoring transition can happen.

Trace amounts of target chemicals can assist (or destroy) surface interaction, or simply increase the nominal top layer thickness to reduce Van der Waals forces. Therefore, an abrupt anchoring transition occurs and results in a visible optical signal.

FIG. 2 shows the relationship between Van der Waals torque to the separation distance, z, from LC molecules to the bottom layer. A is the surface anchoring torque. When the top layer thickness is d1, Van de Waals torque at the first LC layer, U(d1), is bigger than A, thus LC alignment is determined by long range force from the bottom layer. When the top layer thickness is d2, A is bigger, and the LC is aligned by the short range interaction from the top layer.

In other words, the thickness of the top layer determines the strength of the Van der Waals forces at the interface between the alignment film and the LC. Therefore, by adjusting d the LC alignment can be changed between the planar or the homeotropic state.

Based on the foregoing principles and inventive analysis, the inventors have now discovered a liquid crystal device comprising (i) a body of liquid crystal, (ii) a first layer comprising a first material, and (iii) a second layer comprising a second material; wherein the first layer is located between the body of liquid crystal and the second layer; the first layer alone aligns the liquid crystal in a first orientation; the second layer alone aligns the liquid crystal in a second orientation; and the first orientation is different from the second orientation.

The present invention further provides a method of making a liquid crystal device comprising (i) a body of liquid crystal, (ii) a first layer comprising a first material, and (iii) a second layer comprising a second material; wherein the first layer is located between the body of liquid crystal and the second layer; the first layer alone aligns the liquid crystal in a first orientation; the second layer alone aligns the liquid crystal in a second orientation; and the first orientation is different from the second orientation. The method includes the step of providing the second layer; and the step of depositing the first layer at least partially on the second layer.

In exemplary embodiments, the method further comprises the step of adjusting the thickness of the first layer, for example, by adjusting the solids concentration of a spin coating solution used for formation of the first layer.

EXAMPLE 1

Synthesis of Polyamic Acid (PM) of FPI

The precursors BTDA, ODA, MPD were purchased from SigmaAldrich and purified by recrystallization or sublimation. The synthesis protocol for fluorinated PM (F-PM) is described elsewhere (Scheffer, T. J. and Nehring, J. Accurate determination of liquid-crystal tilt bias angles. *Journal of Applied Physics*, 1977. 48: p. 1783-1792). 1.843 g (5.72 mmol) BTDA, 0.573 g (2.86 mmol) ODA and 1.382 g (2.86 mmol) Rf8MPD were charged to a 100 ml reaction kettle. N-Methyl-2-pyrrolidone (NMP, 20.5 ml) was added to dissolve the monomers and the polymerization was allowed to proceed. The solvent quantity was adjusted to a give ~16% solids concentration. The reaction was carried out under nitrogen protection and with good stirring overnight (~16 hours) at room temperature. The PAA was produced as a viscous brownish solution and was stored at −5° C. for future use.

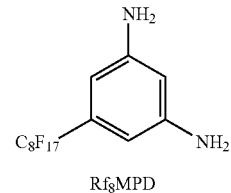

Rf8MPD

EXAMPLE 2

Introducing Sulphur Tagged 2555 (S-2555) for XPS Characterization

Since 2555 and FPI share similar structure and elemental composition, one cannot differentiate the signals from the top and bottom layers by X-ray photoelectron spectroscopy (XPS) analysis. Therefore, ODA was substituted with 4,4'-thiodianiline (TDA) in order to introduce sulphur in the main chain to provide an exclusive XPS signal from the bottom layer. The synthesis of the PM of S-2555 follows the same protocol as for F-PAA described above, except the precursors are BTDA, TDA and MPD in the mole ratios of 2:1:1. Due to the substitution of sulphur, the S-2555 PAA appears much darker than 2555. The S-2555 was coated as a continuous film and testing indicated that it provided strong planar alignment after rubbing.

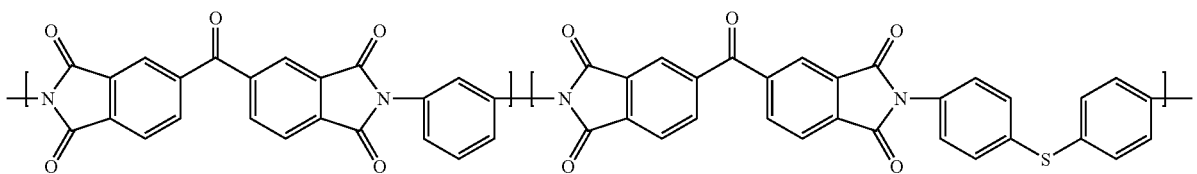

S-2555

EXAMPLE 3

Fabrication of DLAF

The F-PAA solution (16% solid concentration) was warmed to room temperature and diluted with NMP immediately before spincoating. To achieve different film thicknesses, the F-PAA was diluted to a variety of solid concentrations (from 0.1% to 4% by weight). After mechanical homogenization with a Vortex Genie 2, the diluted F-PAA solution was ready to spincoat. The DuPont 2555 polyamic acid (purchased from HD MicroSystems™) had a 20% solids concentration. It was diluted to 4% solids concentration using NMP immediately before spincoating.

Figure 3:
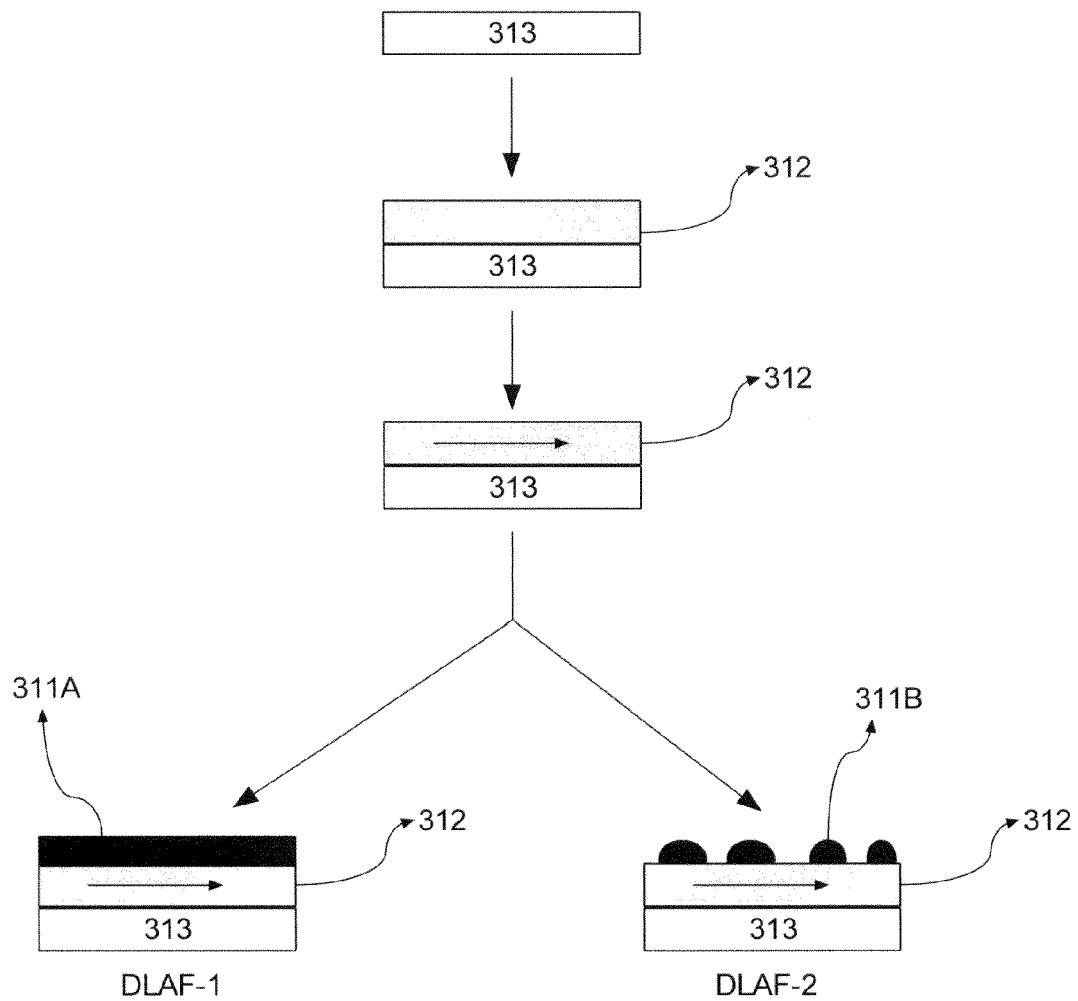
FIG. 3 illustrates the fabrication processes for two types of DLAF in an embodiment according to the present invention.

The fabrication processes for two types of DLAF are illustrated in FIG. 3. The ITO substrates such as glass 313 were cleaned by ultrasonication in an ultrasonic cleaner (Branson) and thoroughly rinsed with deionized water and isopropanol. After drying in an oven (80° C., 20 minutes), the substrates were first spin coated with 2555 312 at 2500 rpm for 20 seconds. The coated substrates were soft baked at 90° C. for 90 seconds to evaporate most of the solvent, followed by a hard bake at 300° C. for 1 hour to complete the imidization reaction. Next, the 2555-coated substrates were rubbed using a velvet cloth along the direction of the white arrow within 312 to produce a strong planar alignment. After rubbing, F-PAA was spincoated on the top of the 2555 at 2500 rpm for 20 seconds, and then soft baked at 90° C. for 90 seconds. The substrates with a double layer coating were baked in the oven following this protocol: keep at 90° C. for 15 minutes; ramp to 260° C. over one hour; keep at 260° C. for 0.5 hour; and finally cool down to room temperature in an hour. This process completed the imidization of F-PAA to FPI 311A. This DLAF with an FPI 311A on the top of 2555 312 was labeled DLAF-1. The DLAF-2 was fabricated following the same process, but substituting the F-PAA with an AF601 solution to form top layer 311B. The original AF601 (Aqueous fluoropolymer, from Du Pont) contains 6% wt fluoropolymer in a C5-18 fluorocarbon solvent. Prior to spincoating, AF601 was diluted to a variety of solid concentrations using the fluorocarbon solvent FC40 (Fluorinert fluids, from 3M).

EXAMPLE 4

Cell Assembly

The DLAF coated substrates were assembled into 16 μm-thick sandwich cells with anti-parallel rubbing directions between the top and bottom plates. The LC ZLI 2293 (2293; purchased from EM chemicals and used without further treatment) was capillary filled into the cells at room temperature. The filled cells were heated to 100° C. (above the clearing point, 85° C. for ZLI 2293) and kept for 10 minutes before slowly cooling down to room temperature.

Atomic force microscopy (AFM) and X-ray photoelectron spectroscopy (XPS) were employed to characterize the DLAF structure and composition. For the XPS studies, the S-2555 replaced 2555 in the DLAF to provide an exclusive XPS signal from the bottom layer. The pretilt angles of the LC test cells assembled with DLAF substrates were measured using the magnetic null method.

EXAMPLE 5

Film Structure Study of DLAF by AFM and XPS

Figure 4:
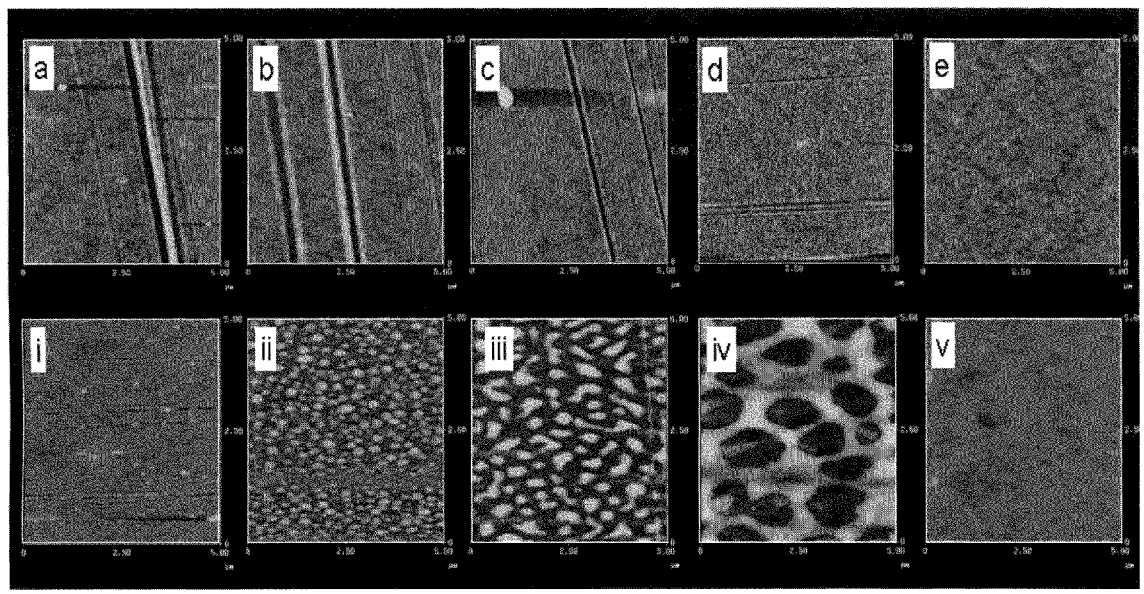
FIG. 4 shows distinctive film structures for two types of DLAF measured by Atomic Force Microscopy (AFM) in an embodiment according to the present invention.

The AFM studies suggest distinctive film structures for the two types of DLAF. The AFM pictures in FIG. 4 are all configured to the same dimension and color-coding. AFM pictures of two DLAF: top row (from a to e) are DLAF-1 with top layer solids concentration of 0.1%, 0.2%, 0.4%, 0.5% and 4%; bottom row (from i to v) are DLAF-2 with top layer solids concentration of 0.06%, 0.1%, 0.2%, 0.3% and 0.4%. As all the substrates have the bottom layer rubbed, some grooves can be seen in the AFM pictures, and they become less obvious as the top layer solids concentration increases. DLAF-1 shows a uniform top layer while DLAF-2 exhibits a clear dewetting behavior. From left to right in the bottom row of FIG. 4, one can see the isolated bright islands (corresponding to AF601) increasing in domain size and coverage as the solids concentration increases. At 0.3%, it changes to a continuous phase and the dark region (corresponding to 2555) is dispersed. When further increased to 0.4%, the AF601 covers the entire surface. It is believed that the difference in the film structure results from the contrast in chemical structures of the two layers.

To obtain more conclusive information on the film structures, the DLAFs were further studied with XPS. The fluorine signal from the top layer (FPI or AF601) and sulphur signal from the bottom layer (S-2555) are ideal to analyze the double layer film structures. Considering the case of a continuous top layer (DLAF-1), the XPS signal from the bottom layer ($I_B$) was attenuated by passage through the top layer. According to the Beer-Lambert law, this intensity decays exponentially as the top layer thickness ($d_T$) increases, ie. $I_B \propto \exp(-d_T/\lambda_{TB})$, where $\lambda_{TB}$ is the attenuation length in the top layer for the electrons emitted from the bottom layer. Meanwhile, the top layer signal ($I_T$) decreases as its thickness gets smaller as $I_T \propto 1 - \exp(-d_T/\lambda_{TT})$, where $I_{TT}$ is the attenuation length of its own electrons within the layer. The ratio of signals from the top to the bottom layer becomes $$\frac{I_T}{I_B} \propto \exp\left(\frac{d_T}{\lambda_{TB}}\right)\left[1 - \exp\left(\frac{k-1}{k}\right)\right],$$

where k is ratio of attenuation lengths $\lambda_{TT}/\lambda_{TB}$. As k is a constant, the ratio $I_T/I_B$, in this case F/S, should follow an exponential growth as the top layer thickness increases. On the other hand, if the top layer is not continuous, the bottom layer signal was detected without passing through the top layer. The ratio $I_T/I_B$ is proportional to the area ratio of the two materials, which should linearly increase with the top layer solid concentration.

Figure 5A:
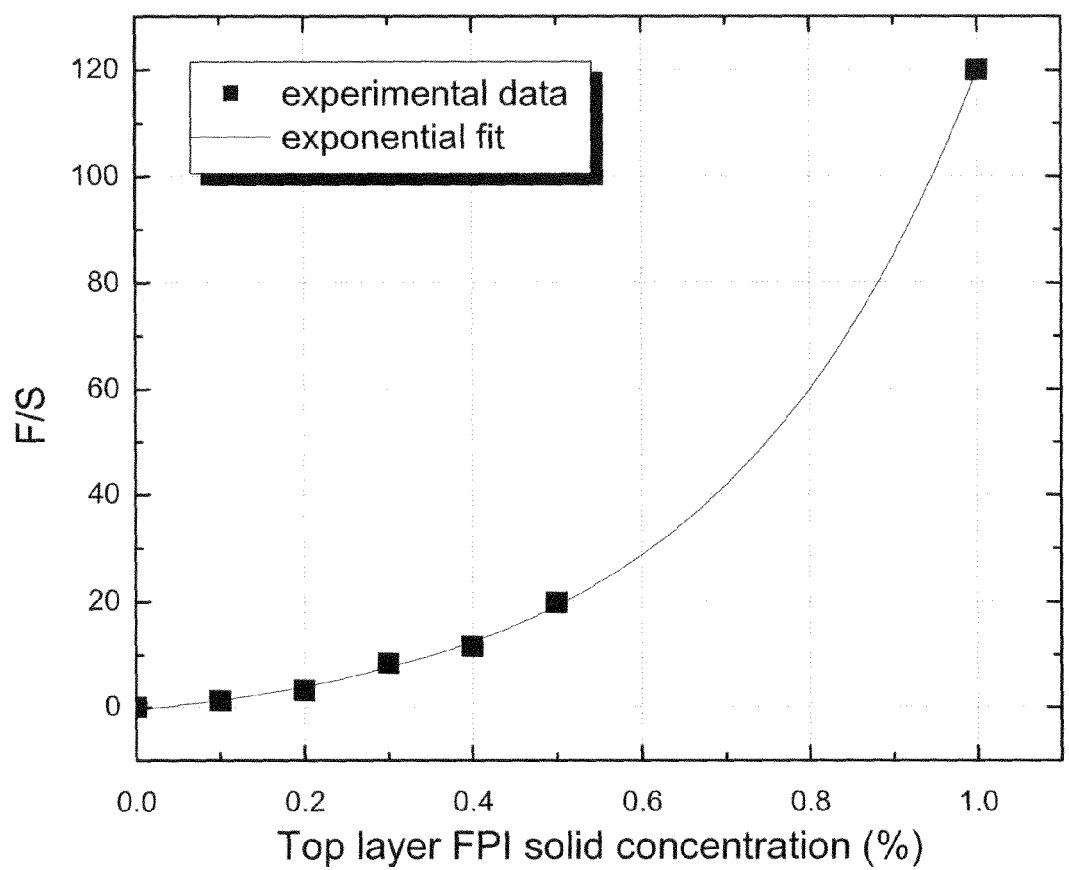
FIG. 5 shows the X-ray Photoelectron Spectroscopy (XPS) data for two types of DLAF in an embodiment according to the present invention.
Figure 5B:
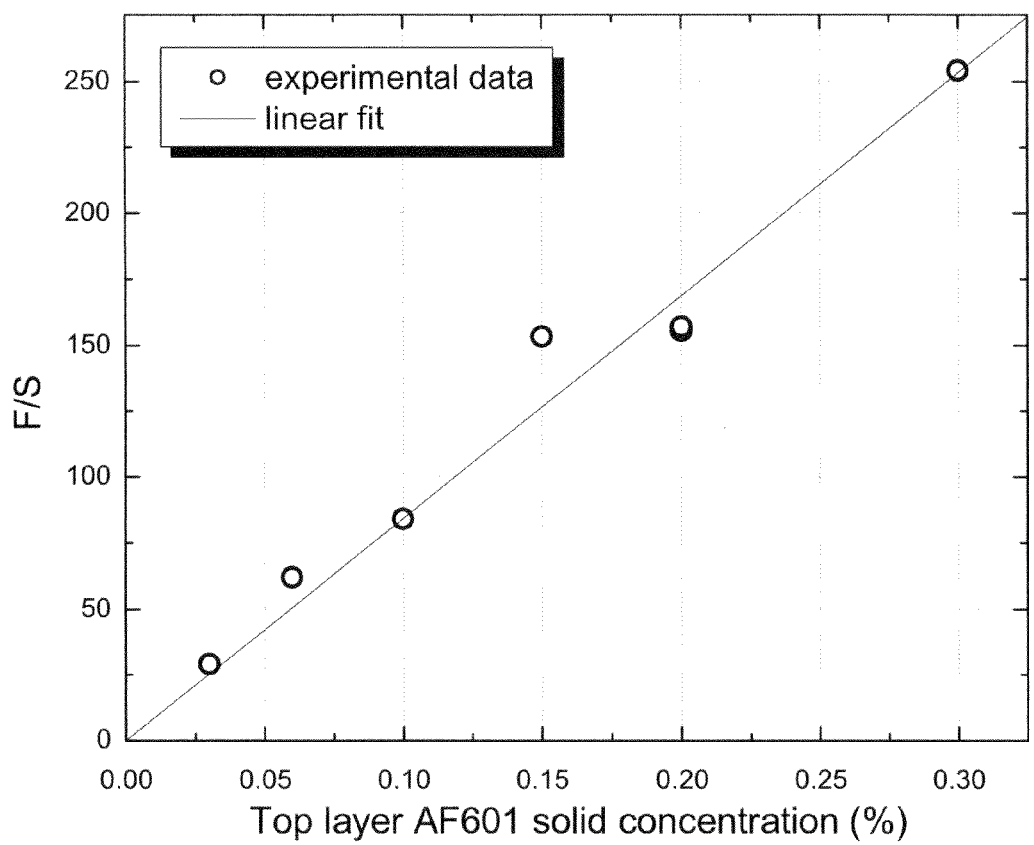

XPS data in FIG. 5 exactly demonstrated these two cases. The DLAF-1 data follow an exponential growth to the FPI solid concentration, which complies with the continuous top layer situation. At low concentration, 0~0.5%, it seems the data might follow a linear pattern. However, the linear fits in 0~0.5%, 0-0.4% and 0-0.3% all results lower correlation coefficients than the exponential fits, as shown in Table 1.

TABLE 1

Fitting correlation coefficients of XPS signal ratio F 1s to S 2s DLAF-1

| | | Data Range | | | |
|---|---|---|---|---|---|
| | | 0~1% | 0~0.5% | 0~0.4% | 0~0.3% |
| Fitting correlation coefficient, $R^2$ | Exponential fit | 0.99979 | 0.99946 | 0.99862 | 0.99995 |
| | Linear fit | 0.90062 | 0.90402 | 0.94228 | 0.98470 |

DLAF-1 is believed to have a continuous top layer structure even at low concentrations. This agrees with the AFM results where only a flat surface is observed for all the FPI samples. In contrast, the DLAF-2 data demonstrate a typical linear relationship and in agreement with the dewetting effect from the AFM study. The XPS data also serve as a good measure for the area ratio of the sample with a discontinuous top layer.

EXAMPLE 6

Pretilt Study of Two Types of DLAF

Figure 6A:
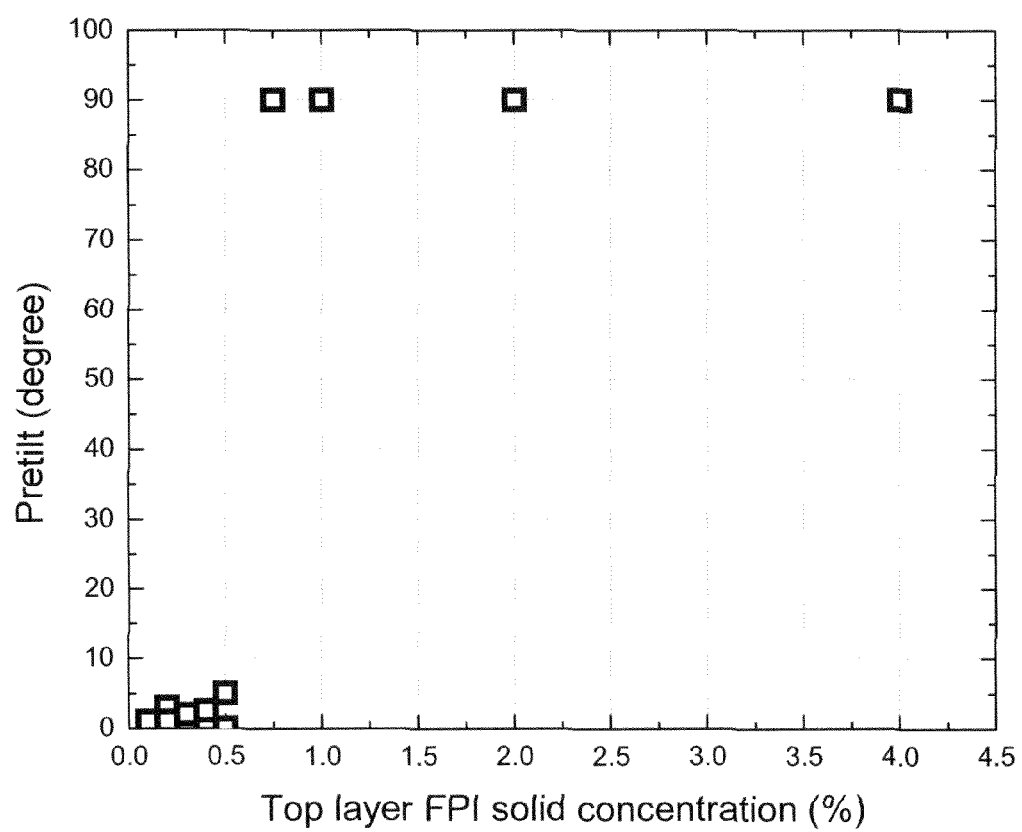
FIG. 6 shows the LC pretilt transitions using DLAF-1 and DLAF-2 as a function of thickness of the first or top layer.
Figure 6B:
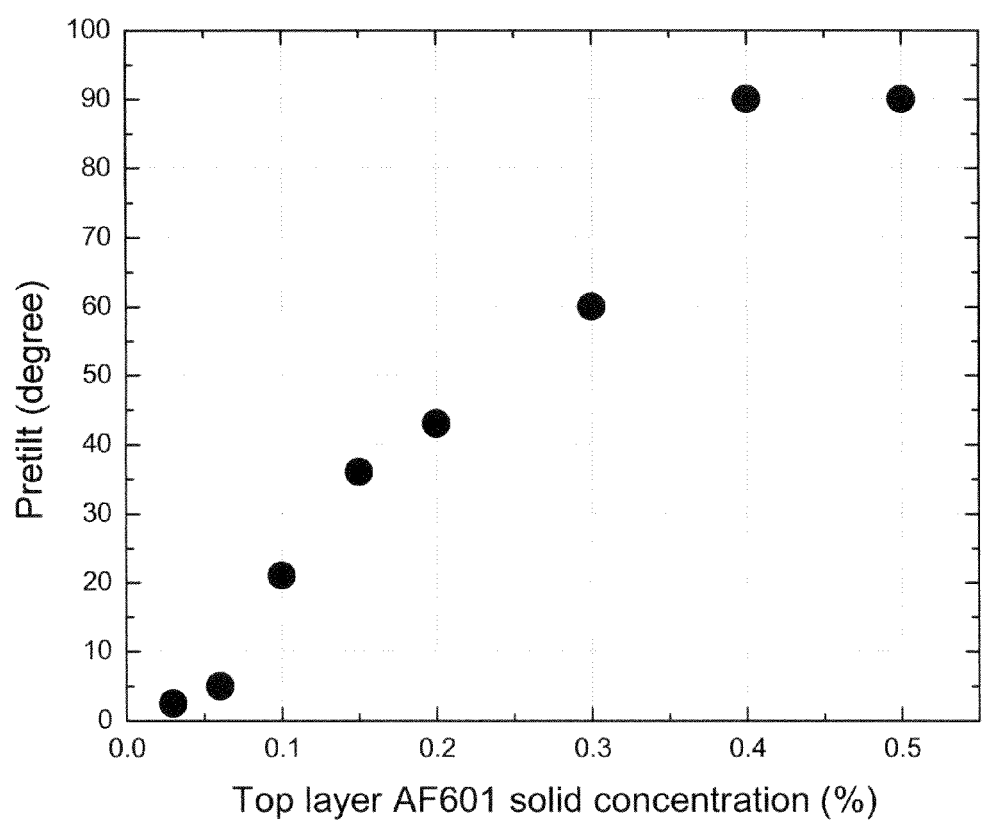

It was found that a single layer of AF601 and FPI both gave homeotropic alignment without rubbing. Therefore, for the case of DLAF, planar alignment should be obtained when the top layer concentration is ~0 (just as for a 2555 single layer), and homeotropic alignment should be obtained when the top layer is continuous and thick enough to shield any influence from the bottom layer, and essentially be treated as a single layer alignment film. This agrees with the results as shown in FIG. 6. What is more interesting is how the pretilt varies in between these two extreme cases. As shown in FIG. 6, for DLAF-2, the pretilt gradually shifts from planar to homeotropic with an increase of solids concentration. In contrast, DLAF-1 gives an abrupt switch from planar to homeotropic almost without intermediate states as a function of thickness of the top layer. Type I and Type II pretilt transition using DLAF-1 and DLAF-2 have been clearly demonstrated respectively.

Without any intention to be bound by any particular theory, it is believed that, for the Type I transition, according to the "local Frederiks transition" theory of Dubois-Violette and de Gennes, the bottom layer and top layer both affect the LC alignment. However, the top layer screens the van der Waals interaction from the bottom layer. The dispersion potential diminishes as $d^3$, where d is the top layer thickness. This leads to an abrupt transition of the pretilt angle vs d. The Type I pretilt change in DLAF-1 type films could be used in sensor applications. The presence of trace quantities of analyte may trigger the pretilt transition, which, in turn, produces a macroscopic optical signal that can be easily detected.

Without intention to be bound by any particular theory, it is believed that, as Kwok has pointed out, the pretilt of an inhomogeneous surface composed of planar and homeotropic domains results from the averaging effect of local alignment of LCs. The value of the pretilt is determined by the anchoring energy ratio and the area ratio of the homeotropic to planar region. Tested DLAF-2 system fits in this theory quite nicely. The method using the dewetting process helps to provide clean domain boundaries between the planar and homeotropic regions. The solid concentration is a very efficient method for precise control of the area ratio. The convenient spincoating procedure is highly compatible with current alignment film fabrication processes.

The DLAF structure is determined by the chemical miscibility of the top and bottom polymer films as well as the spincoating process that produces them. With complete information on chemical structures, one is able to tune the film structures to control the pretilt behavior. The DLAF-1 and DLAF-2 examples are two extreme cases to clearly demonstrate the influence of miscibility. When the top layer material has the miscibility between FPI and AF601, the resulting DLAF might be in an intermediate state between two uniform layers or a dewetted top layer structure, which might affect the pretilt in a more complicated way. On the other hand, the spincoating conditions have a major influence on properties of the resulting film. So the factors like the boiling point of the spincoating solvent, spincoating speed and duration may change the top layer morphology significantly.

EXAMPLE 7

Study of DLAF Response to Lecithin

Figure 7:
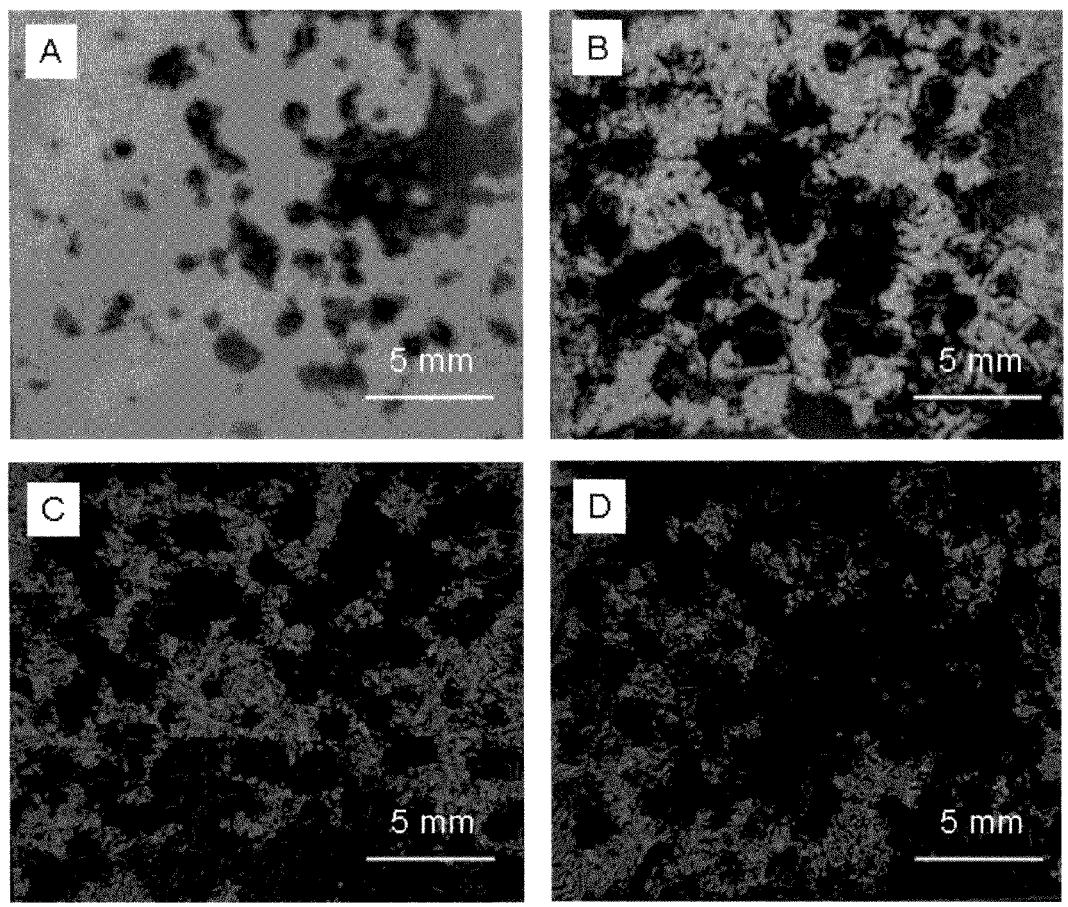
FIG. 7 shows the typical LC orientation profile on 4 DLAFs for a single lecithin concentration in an embodiment according to the present invention.
Figure 8:
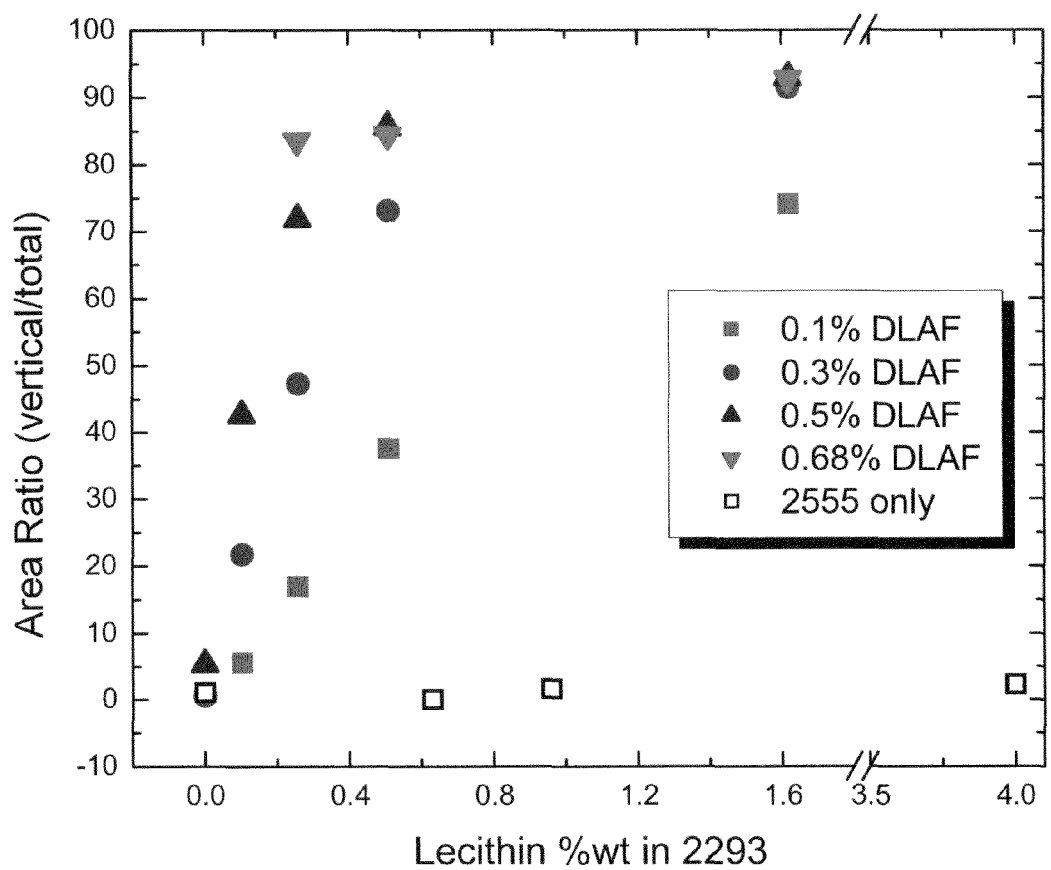
FIG. 8 shows LC cell images between crossed polarizers to demonstrate the relationship between the area ratios between the homeotropic regions to the total area to the lecithin concentration for different DLAF compositions in an embodiment according to the present invention.

The response of a series of DLAF of different top layer thickness to lecithin was tested. Lecithin thin film has been used to produce temporary homeotropic alignment for LC owing to their amphiphilic nature. Lecithin was mixed with ZLI 2293 at different concentrations. These doped LCs were filled into empty cells with DLAF inner coatings. FIG. 7 shows the typical LC orientation profile on 4 DLAFs for a single lecithin concentration. When the top layer is thin (e.g. 0.1% solids), most areas of the cell appear bright (i.e. planar alignment). As the top layer gets thicker, more black regions (i.e. homeotropic alignment) appear. FIG. 7 shows the cell images between crossed polarizers. Lecithin concentration in ZLI 2293 is 0.26% wt. From A to D, top layer solids concentrations are 0.1%, 0.3%, 0.5% and 0.68%, respectively. To quantify this response, the cell images were processed with computer program to measure the area ratio between the homeotropic regions to the total area. The relationship between the area ratios to the lecithin concentration for different DLAF compositions is plotted in FIG. 8. FIG. 8 shows the area ratio analysis of cell images between crossed polarizers. The area ratio is derived using homeotropic area (vertical alignment) divided by the entire area.

Single layer 2555 shows no response to lecithin up to 4%, which is over the saturated concentration of lecithin in ZLI 2293. On the other hand, DLAFs with thick top layers (e.g. 0.68% solids concentration) behave like single layer FPI and show mostly homeotropic for all lecithin concentrations. At medium top layer thickness, one can see the orientation transition from planar to homeotropic as lecithin concentration increases. More importantly, as top layer thickness increase, the critical lecithin concentration for inducing the orientation transition decreases. If "positive" detection of lecithin was defined as 50% cell area turns to homeotropic, it is clear this detection limit reduces dramatically as DLAF's top layer thickness increases. For 0.5% DLAF, which is at the boundary for the pretilt transition of pure LC, the ~0.1% wt lecithin concentration can be positively detected. The sensitivity of the detection can thus be tuned by adjusting the top layer thickness of the DLAF.

In summary, two distinctive pretilt manipulating behaviors have been designed and observed using two types of DLAF with different film structures. The DLAF-1 system gives an abrupt transition from planar to homeotropic as the film thickness increases. This phenomenon can be explained by the Dubois-Violette and de Gennes "local Frederiks transition" theory. The abrupt switch of LC alignment is promising for sensor application when an extremely low concentration of reagent can trigger a dramatic pretilt change producing a macroscopic optical signal. The DLAF-2 system offers a more graduated transition, which agrees with Kwok's theory. The pretilt is the average effect of local alignment on homeotropic and planar domains. DLAF-2 is useful for display applications such as STN and SmC* devices, where stable intermediate pretilt angle and its stability is crucial, and is otherwise difficult to realize using single layer organic materials.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A liquid crystal device comprising:
(i) a body of liquid crystal,
(ii) a first layer comprising a first material, and
(iii) a second layer comprising a second material;
wherein the first layer is located between the body of liquid crystal and the second layer and has a thickness determined by the solids concentration of the first material;

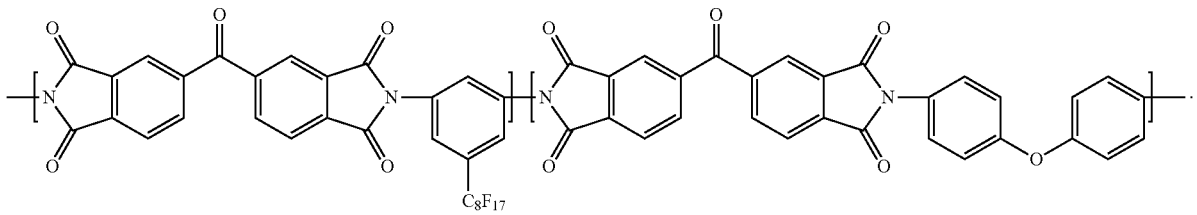

the first layer alone aligns the liquid crystal in a first orientation;
the second layer alone aligns the liquid crystal in a second orientation; and
the first orientation is different from the second orientation.

2. The liquid crystal device according to claim 1, in which the first layer is continuous.

3. The liquid crystal device according to claim 2, in which the first layer alone aligns the liquid crystal in homeotropic orientation; and the second layer alone aligns the liquid crystal in planar orientation.

4. The liquid crystal device according to claim 2, in which the thickness of the first layer is in the range of from about $0.50 \times d_{abr}$ to about $1.00 \times d_{abr}$, wherein $d_{abr}$ is the thickness of the first layer which triggers an abrupt transition of the liquid crystal alignment from the second orientation to the first orientation.

5. The liquid crystal device according to claim 2, in which the thickness of the first layer is in the range of from about $0.75 \times d_{abr}$ to about $1.00 \times d_{abr}$, wherein $d_{abr}$ is the thickness of the first layer which triggers an abrupt transition of the liquid crystal alignment from the second orientation to the first orientation.

6. The liquid crystal device according to claim 2, in which the thickness of the first layer is in the range of from about $0.90 \times d_{abr}$ to about $1.00 \times d_{abr}$, wherein $d_{abr}$ is the thickness of the first layer which triggers an abrupt transition of the liquid crystal alignment from the second orientation to the first orientation.

7. The liquid crystal device according to claim 1, in which the first layer is discontinuous, and a direct interface is formed between a part of the liquid crystal body surface and a part of the second layer surface.

8. The liquid crystal device according to claim 7, in which the first layer alone aligns the liquid crystal in homeotropic/planar orientation; and the second layer alone aligns the liquid crystal in planar/homeotropic orientation.

9. The liquid crystal device according to claim 7, in which the orientation of the liquid crystal exhibits a gradual transition between the first orientation and the second orientation depending upon the area ratio between the liquid crystal/first layer interface and the liquid crystal/second layer interface.

10. The liquid crystal device according to claim 1, in which the first material comprises a fluorinated polymer.

11. The liquid crystal device according to claim 10, in which the fluorinated polymer comprises a fluorinated polyimide.

12. The liquid crystal device according to claim 11, in which the fluorinated polyimide comprises a polymer (FPI) represented by the following formula:

13. The liquid crystal device according to claim 10, in which the fluorinated polymer comprises a copolymer of 4,5-difluoro-2,2-bis(trifluoromethyl)-1,3-dioxole and

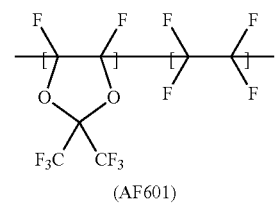

tetrafluoroethlyene (AF601).

14. The liquid crystal device according to claim 1, in which the first material comprises the mixture of a copolymer of 4,5-difluoro-2,2-bis(trifluoromethyl)-1,3-dioxole and tetrafluoroethlyene (AF601) and a polymer represented by the following formula (FPI):

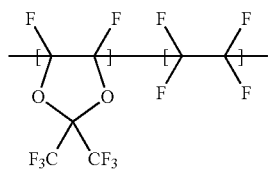
(AF601)

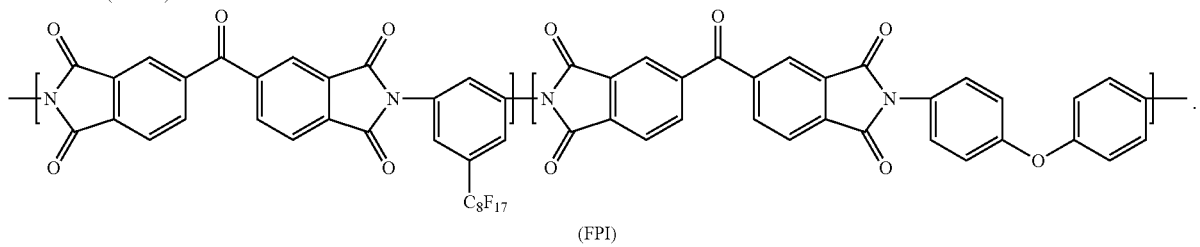
(FPI)

15. The liquid crystal device according to claim 1, in which the second material comprises a non-fluorinated polymer.

16. The liquid crystal device according to claim 15, in which the non-fluorinated polymer comprises a straight-chain polyimide.

17. The liquid crystal device according to claim 16, in which the straight-chain polyimide comprises a copolymer made from benzophenone tetracarboxylic dianhydride (BTDA) and a mixture of the two diamines, 4,4'-oxydianiline (ODA) and m-phenylenediamine (MPD).

18. The liquid crystal device according to claim 2, which is a sensor for electric field, magnetic field, thermal field, chemical species, biochemical species, biological species, or any combination thereof.

19. The liquid crystal device according to claim 7, which is a LCD, a STN device, or a SmC* device.

20. A method of improving the sensitivity of a liquid crystal device's response to an external stimulus including using a liquid crystal device comprising (i) a body of liquid crystal, (ii) a first layer comprising a first material, and (iii) a second layer comprising a second material; wherein the first layer is located between the body of liquid crystal and the second layer and has a thickness determined by the solids concentration of the first material; the first layer alone aligns the liquid crystal in a first orientation; the second layer alone aligns the liquid crystal in a second orientation; and the first orientation is different from the second orientation.

21. The method according to claim 20, in which the external stimulus is selected from electric field, magnetic field, thermal field, chemical species, biochemical species, biological species, and any combination thereof.

22. The method according to claim 20, in which the external stimulus comprises a lecithin surfactant compound.

23. A method of making the liquid crystal device according to claim 1, including a step of providing the second layer; and a step of depositing the first layer at least partially on the second layer.

24. The method according to claim 23, further comprising a step of adjusting the thickness of the first layer.

25. The method according to claim 24, in which the step of adjusting the thickness of the first layer is accomplished by adjusting the solids concentration of a spin coating solution used for formation of the first layer.

* * * * *